United States Patent [19]

Neefe

[11] Patent Number: 5,011,633

[45] Date of Patent: Apr. 30, 1991

[54] METHOD OF CONTROLLING THE THICKNESS OF CAST LENSES

[75] Inventor: Charles W. Neefe, Big Spring, Tex.

[73] Assignee: Sunsoft Lenses, Albuquerque, N. Mex.

[21] Appl. No.: 448,243

[22] Filed: Dec. 11, 1989

[51] Int. Cl.[5] .............................................. B29D 11/00
[52] U.S. Cl. ...................................... 264/1.1; 264/2.1; 425/808
[58] Field of Search ........................ 264/1.1, 2.1, 2.2; 425/808

[56] References Cited

U.S. PATENT DOCUMENTS

| | | | |
|---|---|---|---|
| 3,660,545 | 5/1972 | Wichterle | 264/2.1 |
| 4,022,855 | 5/1977 | Hamblen | 264/2.1 |
| 4,636,338 | 1/1987 | Neefe | 264/2.1 |
| 4,944,899 | 7/1990 | Morland | 264/2.2 |

FOREIGN PATENT DOCUMENTS 2158449 11/1985 United Kingdom ................. 264/2.1

Primary Examiner—James Lowe

[57] ABSTRACT

The invention is a method of metering liquid lens monomer on to the surface of a concave spin casting mold. This is done by an atomized liquid spray applied to the mold optical surface for a precise time. An inert gas such as nitrogen is used to propel the atomized spray from the spray nozzle to the optical mold surface. The atomized spray wets the optical surface evenly reducing the contact angle to the receding angle. The duration of the spray can be precisely timed by an electronic timer valve. The volume of monomer deposited can be precisely controlled therefore the lens thickness is precisely controlled.

20 Claims, 1 Drawing Sheet

METHOD OF CONTROLLING THE THICKNESS OF CAST LENSES

PRIOR ART

The art of spin casting contact lenses has been in use for over twenty years.

Spin casting has proven to be the best process for economically producing large numbers of stock soft contact lenses. The spin cast process provides highly reproducible lenses having controlled parameters.

Spin casting provides a method incorporating inert non-aqueous, water soluble solvents in the soft lens monomer mixture whereby the lens will shrink in size when hydrated and the solvent removed. This shrinkage is believed to enhance the coiling of the polymer chains and this accounts for the improved toughness, resilience and tear resistance of spin cast lenses. The process also lends itself to rapid ultraviolet curing which provides a predictable molecular structure with few toxic byproducts.

The principal value of spin casting is its low cost and high production. Lenses made by spin casting also are most comfortable due to the thin and consistent edge shape provided by spin casting.

The lenses are not spherical and the aspheric surface is of a shape that increases spherical aberration. Spin casting has four disadvantages: (1) The usable optical zone in the center of the lens is reduced requiring the lens to center well. (2) The reduction in visual acuity due to increased spherical aberration effect. (3) Visual acuity will fluxuate with lens movement. (4) The lens thickness is difficult to accurately control.

A method has been employed whereby the advantages of spin casting may be employed to produce soft contact lenses having large optical zones with improved optical quality and reduced spherical aberration effect. This method requires a matching aspheric curve on the convex surface to neutralize the optical effects of the aspheric concave surface produced by spin casting.

SUBJECT OF THE INVENTION

Irregular uneven edges are frequently produced by spin casting. This has been shown to be the result of the monomer not wetting the mold surface evenly out to the edge of the lens mold.

The mold surface may be evenly wetted from center to edge by spraying the atomized monomer on the mold optical surface.

Dry nitrogen or other inert gas may be used to propel the atomized monomer on the mold surface. This will remove unwanted gases and water dissolved in the monomer.

Controlling the thickness of molded lenses is most difficult as the desired thickness control is + or −0.005 millimeter. Lenses having dry diameter of only 8.0 to 11.0 millimeters requires very precise metering of the liquid monomer. Precision metering can be attained repeatedly by spray metering. Constant gas pressure can be obtained from precision regulators. The volume of liquid metered can then be precisely controlled by controlling the time the inert gas is allowed to flow.

Contact angles are measured on macroscopic, smooth nonporous, planar substrates by merely placing a droplet of the liquid or solution on the substrate and determining the contact angle by any of a number of techniques. The contact angle can be measured directly by use of a microscope fitted with a goniometer eyepiece or by photographing the droplet. Indirect measurement of the contact angle can be done by measuring the height and the diameter of the droplet. However, obtaining a valid, reproducible contact angle is more complicated and difficult than it appears, for a number of reasons:

A solid surface, even when apparently smooth, may have impurities and defects that vary from place to place on the surface. The contact angle shows hysteresis in that the advancing contact angle will always be greater than the receding contact angle, sometimes differing by as much as 60°.

Spray metering places an even layer of monomer over the entire optical surface. This even layer of liquid removes the advancing contact angle encountered by placing a metered drop of liquid on the mold optical surface.

DESCRIPTION OF THE PREFERRED EMBODIMENT

The inability of the liquid lens monomer to fully wet the surface of the lens mold produces uneven and irregular edges as well as distortion at the edge of the optical surface. This inability to wet the mold surface is due to contamination or inconsistencies on the mold surface resulting in an equilibrium of forces and uneven edges. Contamination can be in the form of dust particles, oxidation, atmospheric moisture absorption, air borne pollutions or variations in the composition of the mold material. The molding conditions, heat, pressure and injection speed also effect the mold surface. The mold area near the entrance gate may have different molecular and surface qualities, this is especially true if a small gate and fast injection speed are used. Under these conditions the shear forces generated at the gate greatly increases the temperature of the resin being injected and temperatures sufficient to depolymerize the resins can easily be reached. Molecular orientation also occurs inside the gate area. It has been found that the lens edges are smooth and undistorted if liquid monomer is first distributed over the entire mold surface. Improved wetting of the mold surface is provided since receding contact angles in areas where the mold has been wet by the monomer are lower than advancing contact angles in areas where the mold has not yet been wet by the monomer.

Spray metering first deposites man small separate droplets each having a high advancing contact angle. As more droplets arrive on the optical surface they begin to impinge upon each other and join into irregular shapes. As spraying continues the spaces between the irregular shaped liquid areas filled with newly arrived droplets and a continuous liquid film is formed on the optical mold surface. The spraying continues until the predetermined lens thickness is reached, the gas flow is then stopped. A wetted mold surface is provided and a precise lens thickness is achieved.

Figure 1:
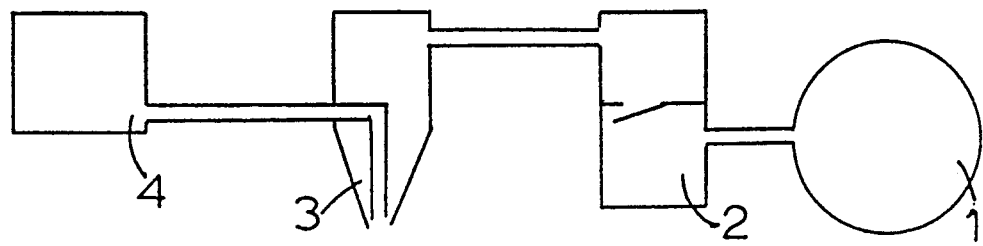
FIG. 1 shows the functional parts of the system in a schematic drawing.
Figure 1:
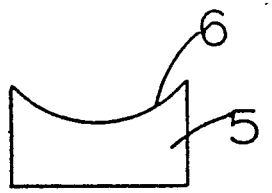

FIG. 1 a schematic drawing showing the relationship of the functioning system.

1 FIG. 1 is a source of pressure regulated gases. Inert gases such as nitrogen, carbon dioxide or helium may be used.

2 FIG. 1 shows a time controlled valve. Electrical time controlled is preferred.
3 FIG. 1 shows the atomizer spray head.
4 FIG. 1 shows the liquid monomer reservoir.
5 FIG. 1 shows the concave lens mold.
6 FIG. 1 shows the concave optical surface to receive the spray coating.

THE METHOD IS CARRIED OUT AS FOLLOWS

Figure 2:
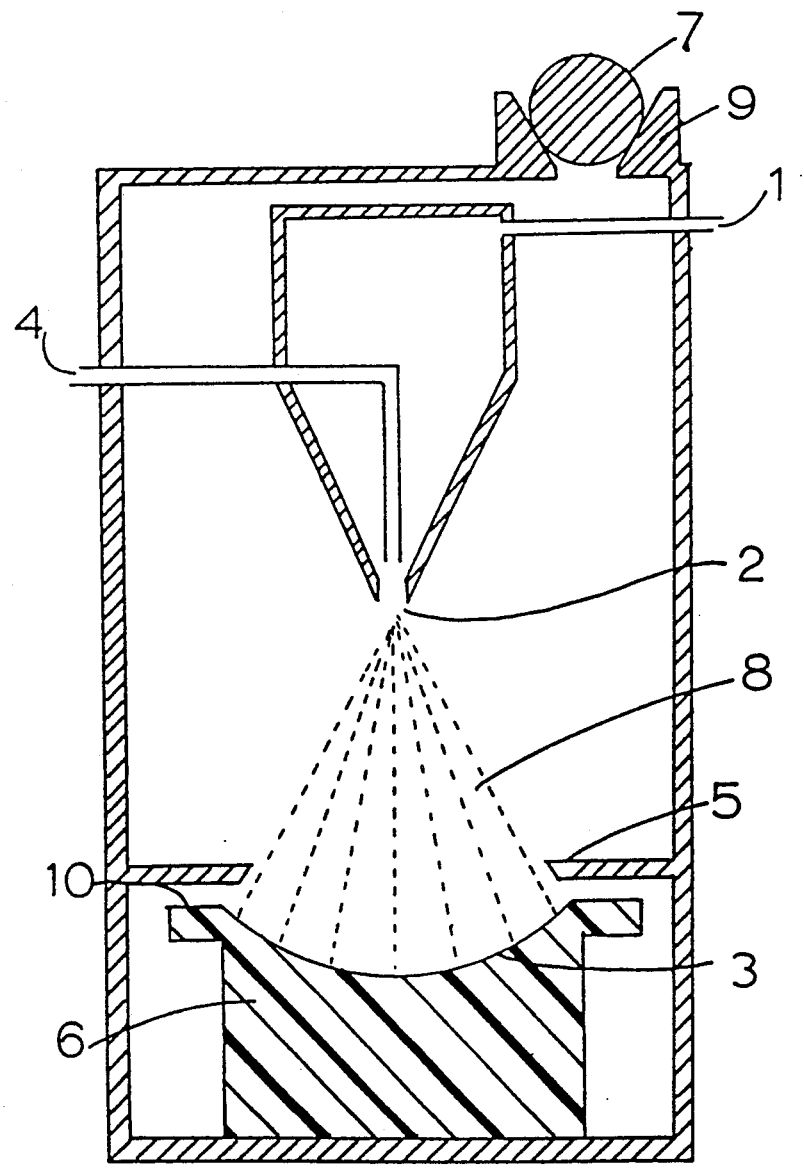
FIG. 2 shows the spray chamber in section.

The plastic lens mold 6 FIG. 2 is placed in the containment vessel 9 FIG. 2.

Liquid monomer is passed through supply line 4 FIG. 2. Inert gas such as dry nitrogen is supplied at a predetermined constant pressure through the gas supply line 1 FIG. 2. The duration of the nitrogen supply is electronically controlled. The pressurized gas and the atomized liquid monomer leave the spray nozzle 2 FIG. 2 and proceed in a cone shaped spray 8 FIG. 2. The liquid monomer droplets are collected on the concave optical surface 3 FIG. 2. Ball valve 7 FIG. 2 is provided to allow the spent nitrogen to escape the containment vessel. A baffle 5 FIG. 2 is provided to protect the flat flange 10 FIG. 2 from the spray. The nitrogen gas is entrapped above the monomer layer present on the concave optical surface 3 FIG. 2 by placing a piece of transparent clear plastic adhesive tape over the concave mold and sealing it to the flat flange 10 FIG. 2. Liquid monomer must be prevented from depositing on flat flange surface 10 FIG. 2 as any residue will prevent sealing of the transparent adhesive tape to the mold flange 10 FIG. 2.

The liquid monomer has been deposited over the entire optical surface, a precise volume of liquid monomer has been deposited on the concave lens mold and a hermetic seal provided. The sealed lens mold is removed from the containment vessel and sent for further processing. The mold 6 FIG. 2 is placed on a spin casting machine and rotated around the lens optical axis. Ultra violet light is passed through the transparent adhesive tape to effect polymerization of the rotating liquid lens monomer to form a solid xerogel lens. Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of controlling the thickness of a spin cast lens by the steps of, providing a pressure controlled source of an inert gas and a time controlled valve, supplying the pressure controlled inert gas to a spray nozzle for a predetermined time, and providing a liquid lens monomer to the spray nozel, allowing the liquid lens monomer to be atomized by the inert gas leaving the spray nozzle to form a cone shape pattern, placing a concave lens mold in the cone shaped spray to collect the atomized spray on the concave optical mold surface, allowing the inert gas to flow for the predetermined time thereby controlling the volume of monomer deposited on the optical mold surface then polymerizing the monomer while spinning the mold, thereby controlling the thickness of the finished lens.

2. A method of controlling the thickness of a cast lens comprising spraying the liquid monomer on the optical mold surface and then polymerizing the monomer to form a lens wherein the volume of liquid monomer deposited on the mold optical surface is controlled by spraying the liquid monomer on the mold optical surface by a timed spray composed of atomized liquid monomer and an inert gas.

3. A method of controlling the thickness of a spin cast lens by supplying a timed source of pressure regulated inert gas and a liquid lens monomer to a spray nozel which is capable of atomizing the liquid lens monomer, spraying and collecting atomized liquid lens monomer on the concave optical surface of a spin casting lens mold for a predetermined time, thereby controlling the volume of liquid monomer collected on the concave lens mold, spinning the mold and polymerizing the monomer to form a lens and thereby controlling the thickness of the finished spin cast lens.

4. A method as in claim 1 wherein a baffle is provided to prevent the liquid monomer spray from reaching the edge of the lens mold.

5. A method as in claim 2 wherein a baffle is provided to prevent the liquid monomer spray from reaching the edge of the lens mold.

6. A method as in claim 3 wherein a baffle is provided to prevent the liquid monomer spray from reaching the edge of the lens mold.

7. A method as in claim 1 wherein the spraying is carried out in a containment vessel.

8. A method as in claim 2 wherein the spraying is carried out in a containment vessel.

9. A method as in claim 3 wherein the spraying is carried out in a containment vessel.

10. A method as in claim 7 wherein an escape valve is provided for the inert gas to leave the containment vessel.

11. A method as in claim 8 wherein an escape valve is provided for the inert gas to leave the containment vessel.

12. A method as in claim 9 wherein an escape valve is provided for the inert gas to leave the containment vessel.

13. A method as in claim 1 wherein the spray time is controlled by an electronically controlled valve.

14. A method as in claim 2 wherein the spray time is controlled by an electronically controlled valve.

15. A method as in claim 3 wherein the spray time is controlled by an electronically controlled valve.

16. A method as in claim 1 wherein the spray deposits a layer of monomer over the entire mold optical surface.

17. A method as in claim 2 wherein the spray deposits a layer of monomer over the entire mold optical surface.

18. A method as in claim 3 wherein the spray deposits a layer of monomer over the entire mold optical surface.

19. A method as in claim 2 wherein the atomized spray is cone shaped.

20. A method as in claim 3 wherein the atomized spray is cone shaped.

* * * * *